United States Patent Office 3,655,657
Patented Apr. 11, 1972

3,655,657
2,1,4-BENZOTHIADIAZINE-3-CARBAMIC
ACID ESTERS
John B. Adams, Jr., Wilmington, Del., assignor to E. I. du
Pont de Nemours and Company, Wilmington, Del.
No Drawing. Continuation-in-part of application Ser. No.
14,212, Feb. 24, 1970. This application Oct. 20, 1970,
Ser. No. 82,529
Int. Cl. C07d 93/30
U.S. Cl. 260—243 R    8 Claims

ABSTRACT OF THE DISCLOSURE

A group of substituted 1H-2,1,4-benzothiadiazine-3-carbamic acid esters are useful for controlling fungi and mites. These compounds can be prepared by the reaction of an o-nitroaniline with an alkoxycarbonyl isothiocyanate followed by the alkaline hydrosulfite reduction of the intermediate formed.

A compound exemplary of the group is 1H-2,1,4-benzothiadiazine-3-carbamic acid, methyl ester.

CROSS-REFERENCE TO RELATED APPLICATION

This application is a continuation-in-part of my copending application Ser. No. 14,212 filed Feb. 24, 1970, in my name and entitled "Thiadiazine Fungicides."

BACKGROUND OF THE INVENTION

This invention relates to a group of substituted 1H-2,1,4-benzothiadiazine-3-carbamic acid esters, and to methods of using these compounds to prevent or mitigate damage to plants and inanimate organic materials by fungi and mites.

The survival of man has for a long time been dependent in a large measure upon his ability to protect from the various agents of destruction, plants and their products which satisfy his basic needs. With the rapidly increasing population of the world, it becomes imperative that there be continuing great improvements in the efficiency of the materials and the methods employed to provide this protection. These improvements can be in the form of effective control of more kinds of pests or in the form of requiring less material or work. The materials and methods of this invention represent marked advances in both of these possible areas of improvement, as will be explained more fully.

It has been discovered that application of the compounds of this invention by the methods of this invention entirely precludes or reduces damage to plants and inanimate organic materials due to fungi and mites. Fungus mycelia are killed or prevented from developing further by the presence of one or more of the compounds, i.e., the compounds are fungicidal or fungistatic. The compounds further prevent mite populations from expanding or reduce them to a low level or even eliminate them by chemosterilant action on the adults and miticidal action on the immature mites.

SUMMARY OF THE INVENTION

It has been found that the above outstanding fungicidal activity and mite activity can be obtained by applying to the locus of infection and/or infestation, the compounds represented by the following formula:

Formula I

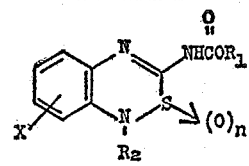

wherein:

X is hydrogen, halogen, alkyl of 1 to 4 carbon atoms, alkoxy of 1 to 4 carbon atoms, or trifluoromethyl;
$R_1$ is alkyl of 1 to 4 carbon atoms or allyl;
$n$ is 0 or 1;
$R_2$ is hydrogen,

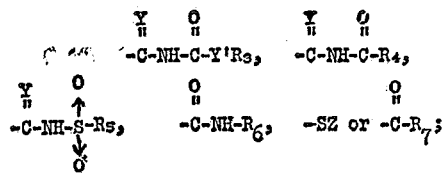

Y and Y' are oxygen or sulfur;
$R_3$ is alkyl of 1 to 4 carbon atoms;
$R_4$ is alkyl of 1 to 17 carbon atoms; cycloalkyl of 3 to 6 carbon atoms; aryl of 4 to 10 carbon atoms; phenyl substituted with alkyl of 1 to 4 carbon atoms, halogen, nitro, alkoxy of 1 to 4 carbon atoms or cyano;
$R_5$ is alkyl of 1 to 18 carbon atoms; phenyl; phenyl substituted with alkyl of 1 to 4 carbon atoms, halogen, nitro, alkoxy of 1 to 4 carbon atoms or cyano;
$R_6$ is alkyl of 1 to 12 carbon atoms, aryl of 4 to 10 carbon atoms or phenyl substituted with alkyl of 1 to 4 carbon atoms, halogen, nitro, alkoxy of 1 to 4 carbon atoms or cyano;
$R_7$ is alkyl of 1 to 17 carbon atoms; alkoxy of 1 to 12 carbon atoms; alkenyloxy of 3 to 4 carbon atoms; phenoxy; benzyloxy; or cycloalkoxy of 5 to 6 carbon atoms; and
Z is alkyl of 1 to 2 carbon atoms; alkyl of 1 to 2 carbon atoms substituted with chlorine or fluorine; phenyl; phenyl substituted with methyl, chlorine, nitro or methoxy; or benzyl.

Preferred because of their biological activity are those compounds where X is hydrogen; $R_1$ is methyl or ethyl; $n$ is 0 or 1; $R_2$ is hydrogen,

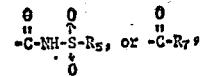

$R_5$ is phenyl; phenyl substituted with methyl, chlorine, or nitro; $R_7$ is alkyl of 1 to 17 carbon atoms, alkoxy of 1 to 4 carbon atoms, phenoxy, or benzyloxy.

More preferred because of their biological activity are those compounds where X and $R_2$ are both hydrogen, $n$ is 0, and $R_1$ is alkyl of 1 to 2 carbon atoms.

Most preferred is the compound where X and $R_2$ are hydrogen, $n$ is 0, and $R_1$ is methyl; this compound is 1H-2,1,4-benzothiadiazine-3-carbamic acid, methyl ester.

DETAILED DESCRIPTION OF THE INVENTION

The compounds of Formula I wherein $n$ is 0 and $R_2$ is H can be prepared by the reaction of an o-nitroaniline with an alkoxycarbonyl isothiocyanate followed by the reduction of the intermediate formed. The reduction can be accomplished with alkaline hydrosulfite or certain other reducing agents. The reaction is illustrated by the following equations.

(step 1)

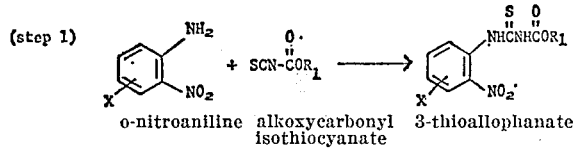

o-nitroaniline   alkoxycarbonyl   3-thioallophanate
                 isothiocyanate where X is hydrogen, halogen, alkyl of 1 to 4 carbons, alkoxy of 1 to 4 carbons or trifluoromethyl and $R_1$ is alkyl of 1 to 4 carbons or allyl.

(step 2)

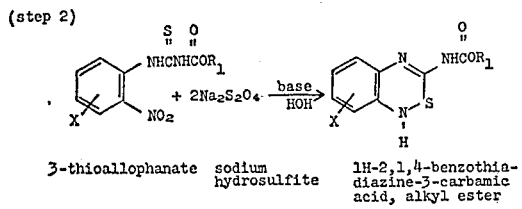

3-thioallophanate   sodium          1H-2,1,4-benzothia-
                    hydrosulfite    diazine-3-carbamic
                                    acid, alkyl ester The other compounds of Formula I can be made by use of the following additional steps.

(step 3)

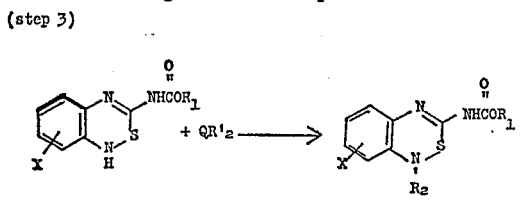

Formula II
1H-2,1,4-benzothiadiazine-3-carbonic acid, alkyl ester where $R_2$ is as defined in Formula I except that it is not hydrogen and $QR'_2$ is the isocyanate, isothiocyanate, alkanoyl halide or sulfenyl halide used to introduce this $R_2$ group.

It should be noted that the position(s) of the group $R_2$ in Formula II have not been established with complete certainty. The structure illustrated as Formula II in step 3 is believed to be the most likely structure of the molecule. However, this graphic illustration is representative only and is intended to include the isomeric variations of the compounds as they are likely to occur. For example, the following isomeric variations may occur:

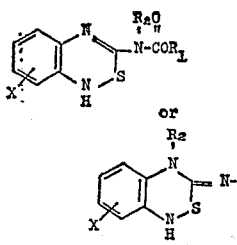

(step 4)

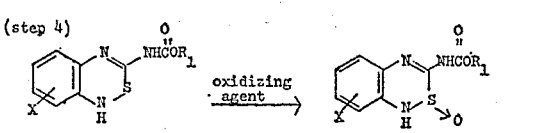

1H-2,1,4-benzothiadiazine    1H-2,1,4-benzothiadiazine
-3-carbamic acid, alkyl      -2-oxo-3-carbamic acid,
ester                        alkyl ester (step 5)

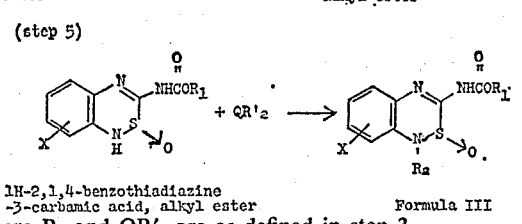

1H-2,1,4-benzothiadiazine
-3-carbamic acid, alkyl ester        Formula III where $R_2$ and $QR'_2$ are as defined in step 3.

Formula III, like Formula II, is representative only and is intended to include the isomeric variations of the compounds as they are likely to occur.

In step 1, the alkoxycarbonyl isothiocyanate can be added to an o-nitroaniline in a suitable solvent such as benzene, toluene, methylene chloride, acetonitrile, acetone, butanone or ethyl acetate. An alternate procedure involves generating the alkoxycarbonyl isothiocyanate from a thiocyanic acid salt, such as potassium thiocyanate, and an alkyl chloroformate in the presence of the o-nitroaniline. In the latter case, solvents in which the thiocyanate salt is somewhat soluble are preferred, such as acetonitrile, acetone or butanone.

The amount of solvent for the first reaction can range from that which is necessary to keep the reaction stirrable up to that which gives a 5% concentration of the 3-thioallophanate product. The temperatures can range from $-20°$ C. to the boiling point of the solvent with $0°$ C. to $25°$ C. being preferred. If the 3-thioallophanate is insoluble in the solvent used, it is collected by filtration; otherwise it can be isolated by evaporation of the solvent and recrystallization or suitable washing of the residue. If the alkoxycarbonyl isothiocyanate was generated in situ, it will be necessary to remove a metal halide from the 3-thioallophanate by washing with water in order to obtain the pure product.

Reduction of the 3-thioallophanate in step 2 can be accomplished in basic aqueous medium or lower alkanol, 1 to 4 carbons, medium or in a mixture of the alkanol and water by treatment with solid sodium hydrosulfite. The base can be an amine base; an ammonium hydroxide; alkali metal hydroxide, alkoxide or carbonate; or an alkaline earth hydroxide. The 3-thioallophanate is dissolved (partially or entirely) in the basic solution, and the hydrosulfite is added to the stirred reaction mixture. The concentration can be such that the product amounts to 0.5% to 25% of the reaction mixture. Preferred concentrations are 2 to 10%.

The base and hydrosulfite can be added simultaneously to the thioallophanate in water, alkanol or a mixture of water-alkanol. The temperature can be from the freezing point of the solvent or $-30°$ C. up to the boiling point of the system. The preferred temperature range is $0°$ to $40°$ C. Instead of sodium hydrosulfite, other hydrosulfites or certain other reducing agents can be used. The product, 1H-2,1,4-benzothiadiazine-3-carbamic acid, alkyl ester, precipitates during the reaction or after acidification and can be isolated by filtration.

In step 3, the product of step 2 can be reacted with an isocyanate or isothiocyanate in a variety of solvents. Typical solvents are diethyl ether, tetrahydrofuran, ethyl acetate, acetone, butanone, dimethylformamide, dimethylacetamide, benzene, methylene chloride, chloroform or carbon tetrachloride. The temperature can vary from $-10°$ C. to $50°$ C.; the preferred temperature is $20-30°$ C. The isocyanate or isothiocyanate is generally added to the product of step 2. The reaction of the product of step 2 with a sulfenyl halide or alkanoyl halide is carried out using the same type solvents and the same temperature ranges, but in this instance an acid acceptor is used. Suitable acid acceptors are the tertiary amine bases, such as pyridine, triethylamine, trimethylamine, triethylenediamine, and the like.

Step 4 is the oxidation of a 1H-2,1,4-benzothiadiazine-3-carbamic acid, alkyl ester with a peracid. Suitable peracids include peracetic, performic, perbenzoic, m-chloroperbenzoic, monoperphthalic and the like.

Step 5 is performed in the same general manner as step 3.

The general method of preparing the compounds of this invention is illustrated by the following examples, the amounts and percents in the examples being in parts by weight and temperatures in degrees centigrade unless otherwise indicated.

EXAMPLE 1

Preparation of 4-(o-nitrophenyl)-3-thioallophanic acid, methyl ester

A mixture of 48.6 parts of potassium thiocyanate and 69.1 parts of o-nitroaniline in 198 parts of acetone is stirred at about 25° C. until most of the o-nitroaniline is in solution. The stirred mixture is then cooled to about 15° C. and treated at that temperature with 47.2 parts of methyl chloroformate during about 18 minutes. After a further 12 hours at 15° C. and 15 hours at 25° C., the mixture is cooled to −5° C., filtered, and the yellow solid washed with water and dried in vacuo. Yield: 75.1 parts (59% of theoretical amount) of crystalline, yellow 4-(o-nitrophenyl)-3-thioallophanic acid, methyl ester; M.P. 185.5°, dec.

EXAMPLE 2

Preparation of 1H-2,1,4-benzothiadiazine-3-carbamic acid, methyl ester

One hundred fifty-three parts of 4-(o-nitrophenyl)-3-thioallophanic acid, methyl ester is dissolved in a solution of 96 parts of sodium hydroxide in 3000 parts of water at 20° under a nitrogen atmosphere. The clear, red solution is then treated, portionwise, during 8 minutes with cooling by an ice bath to a temperature range of 10–25° C., with 270 parts of technical grade sodium hydrosulfite (a 16.5% excess of the theoretical amount, assuming 90% as $Na_2S_2O_4$). A light-yellow solid precipitates toward the end of the hydrosulfite addition. Stirring is continued for 3 to 4 minutes after all of the hydrosulfite is added. The mixture is filtered and the light-yellow solid washed successively with water (2 x 600 parts), methanol (360 parts) and diethyl ether (450 parts), then recrystallized twice from 1000 parts of tetrahydrofuran: hexane (45:55) to afford 102 parts (76% of theoretical amount) of white powder, 1H-2,1,4-benzothiadiazine-3-carbamic acid, methyl ester; M.P. 180° C., dec.

Analysis.—Calcd. for $C_9H_9N_3O_2S$ (percent): C, 48.42; H, 4.06; N, 18.82; S, 14.36. Found (percent): C, 48.39; H, 4.11; N, 18.74; S, 14.49.

The following compounds are prepared by the procedures of Examples 1 and 2 by substituting the appropriate alkyl chloroformate for the methyl chloroformate of Example 1.

1H-2,1,4-benzothiadiazine-3-carbamic acid, methyl ester
1H-2,1,4-benzothiadiazine-3-carbamic acid, ethyl ester
1H-2,1,4-benzothiadiazine-3-carbamic acid, isopropyl ester
1H-2,1,4-benzothiadiazine-3-carbamic acid, propyl ester
1H-2,1,4-benzothiadiazine-3-carbamic acid, butyl ester
1H-2,1,4-benzothiadiazine-3-carbamic acid, isobutyl ester
1H-2,1,4-benzothiadiazine-3-carbamic acid, sec-butyl ester
1H-2,1,4-benzothiadiazine-3-carbamic acid, allyl ester The following compounds are prepared by the procedures of Example 1 by replacing the o-nitroaniline of Example 1 with an appropriately substituted o-nitroaniline.

7-chloro-1H-2,1,4-benzothiadiazine-3-carbamic acid, methyl ester
7-fluoro-1H-2,1,4-benzothiadiazine-3-carbamic acid, methyl ester
7-bromo-1H-2,1,4-benzothiadiazine-3-carbamic acid, methyl ester
7-iodo-1H-2,1,4-benzothiadiazine-3-carbamic acid, methyl ester
7-methyl-1H-2,1,4-benzothiadiazine-3-carbamic acid, methyl ester
7-butyl-1H-2,1,4-benzothiadiazine-3-carbamic acid, methyl ester
7-methoxy-1H-2,1,4-benzothiadiazine-3-carbamic acid, methyl ester
7-butoxy-1H-2,1,4-benzothiadiazine-3-carbamic acid, methyl ester
7-trifluoromethyl-1H-2,1,4-benzothiadiazine-3-carbamic acid methyl ester
5-fluoro-1H-2,1,4-benzothiadiazine-3-carbamic acid, methyl ester
6-fluoro-1H-2,1,4-benzothiadiazine-3-carbamic acid, methyl ester

EXAMPLE 3

Preparation of 1H-2,1,4-benzothiadiazine-2-oxo-3-carbamic acid, methyl ester

Four and forty-six hundredths parts of 1H-2,1,4-benzothiadiazine-3-carbamic acid, methyl ester is dissolved in 89 parts of tetrahydrofuran. A solution of 4.06 parts of m-chloroperbenzoic acid (85% purity) in the minimum quantity of tetrahydrofuran is added portionwise, the temperature being allowed to rise to 49° C. After about 10 minutes, the solution is brought to the cloud point by addition of hexane, and then is further diluted with 260 parts of diethyl ether.

The precipitated solid product is filtered off and washed with ether. Recrystallization of the product from tetrahydrofuran by dilution with hexane affords 3.5 parts (73% of the theoretical amount) of pure 1H-2,1,4-benzothiadiazine-2-oxo-3-carbamic acid, methyl ester as a white solid, decomposition point ca. 178°.

Analysis.—Calcd. for $C_9H_9N_3O_3S$ (percent): C, 45.18; H, 3.79; N, 17.56; S, 13.40. Found (percent): C, 45.33; H, 4.09; N, 17.22; S, 13.26.

EXAMPLE 4

Preparation of 1-(p-toluenesulfonylcarbamoyl)-2,1,4-benzothiadiazine-3-carbamic acid, methyl ester Four hundred forty-six parts of 1H-2,1,4-benzothiadiazine-3-carbamic acid, methyl ester is suspended in 2500 parts of tetrahydrofuran at 25°. To this stirred mixture is added, portionwise, 394 of p-toluene-sulfonyl isocyanate; the temperature rapidly rises to about 43° and the mixture becomes a clear yellow solution. Evaporation in vacuo of the solvent leaves a tacky foam, which becomes a white solid on treatment with diethyl ether. Recrystallization from tetrahydrofuran (ca. 8000 parts) by cooling and bringing to the cloud point with hexane, then further diluting with ether, affords 690 parts (82% of theoretical amount) of white solid, 1-(p-toluenesulfonylcarbamoyl)-2,1,4-benzothiadiazine-3-carbamic acid, methyl ester; M.P.: ca. 151–154° C., dec.

Analysis.—Calcd. for $C_{17}H_{16}N_4O_5S_2$ (percent): C, 48.5; H, 3.8; N, 13.3; S, 15.2. Found (percent): C, 48.5; H, 4.0; N, 13.2; S, 14.8.

The following compounds are prepared by the above procedure by replacing the p-toluenesulfonyl isocyanate with the appropriate isocyanate or isothiocyanate.

1-(methoxycarbonylthiocarbamoyl)-2,1,4-benzothiadiazine-3-carbamic acid, methyl ester
1-(methoxycarbonylthiocarbamoyl)-2,1,4-benzothiadiazine-3-carbamic acid, methyl ester
1-(methylthiolcarbonylthiocarbamoyl)-2,1,4-benzothiadiazine-3-carbamic acid, methyl ester
1-(butyloxycarbonylcarbamoyl)-2,1,4-benzothiadiazine-3-carbamic acid, methyl ester
1-(acetylcarbamoyl)-2,1,4-benzothiadiazine-3-carbamic acid, methyl ester
1-(acetylthiocarbamoyl)-2,1,4-benzothiadiazine-3-carbamic acid, methyl ester
1-(stearoylthiocarbamoyl)-2,1,4-benzothiadiazine-3-carbamic acid, methyl ester
1-(cyclopropylcarbonylthiocarbamoyl)-2,1,4-benzothiadiazine-3-carbamic acid, methyl ester
1-(cyclohexylcarbonylthiocarbamoyl)-2,1,4-benzothiadiazine-3-carbamic acid, methyl ester
1-(3-furoylthiocarbamoyl)-2,1,4-benbothiadiazine-3-carbamic acid, methyl ester
1-(benzoylthiocarbamyl)-2,1,4-benzothiadiazine-3-carbamic acid, methyl ester 1-(α-naphthoylthiocarbamoyl)-2,1,4-benzothiadiazine-3-carbamic acid, methyl ester
1-(o-fluorobenzoylthiocarbamoyl)-2,1,4-benzothiadiazine-3-carbamic acid, methyl ester
1-(p-chlorobenzoylthiocarbamoyl)-2,1,4-benzothiadiazine-3-carbamic acid, methyl ester
1-(m-bromobenzoylthiocarbamoyl)-2,1,4-benzothiadiazine-3-carbamic acid, methyl ester
1-(p-toluoylthiocarbamoyl)-2,1,4-benzothiadiazine-3-carbamic acid, methyl ester
1-(p-butylbenzoylthiocarbamoyl)-2,1,4-benzothiadiazine-3-carbamic acid, methyl ester
1-(p-methoxybenzoylthiocarbamoyl)-2,1,4-benzothiadiazine-3-carbamic acid, methyl ester
1-(p-butoxybenzoylthiocarbamoyl)-2,1,4-benzothiadiazine-3-carbamic acid, methyl ester
1-(p-nitrobenzoylthiocarbamoyl)-2,1,4-benzothiadiazine-3-carbamic acid, methyl ester
1-(p-cyanobenzoylthiocarbamoyl)-2,1,4-benzothiadiazine-3-carbamic acid, methyl ester
1-(methylsulfonylthiocarbamoyl)-2,1,4-benzothiadiazine-3-carbamic acid, methyl ester
1-(stearylsulfonylthiocarbamoyl)-2,1,4-benzothiadiazine-3-carbamic acid, methyl ester
1-(phenylsulfonylthiocarbamoyl)-2,1,4-benzothiadiazine-3-carbamic acid, methyl ester
1-(p-tolylsulfonylcarbamoyl)-2,1,4-benzothiadiazine-3-carbamic acid, methyl ester
1-(p-butylphenylsulfonylthiocarbamoyl)-2,1,4-benzothiadiazine-3-carbamic acid, methyl ester
1-(p-methoxyphenylsulfonylthiocarbamoyl)-2,1,4-benzothiadiazine-3-carbamic acid, methyl ester
1-(p-butoxyphenylsulfonylthiocarbamoyl)-2,1,4-benzothiadiazine-3-carbamic acid, methyl ester
1-(o-fluorophenylsulfonylthiocarbamoyl)-2,1,4-benzothiadiazine-3-carbamic acid, methyl ester
1-(m-bromophenylsulfonylthiocarbamoyl)-2,1,4-benzothiadiazine-3-carbamic acid, methyl ester
1-(p-chlorophenylsulfonylthiocarbamoyl)-2,1,4-benzothiadiazine-3-carbamic acid, methyl ester
1-(p-cyanophenylsulfonylcarbamoyl)-2,1,4-benzothiadiazine-3-carbamic acid, methyl ester
1-(p-nitrophenylsulfonylcarbamoyl)-2,1,4-benzothiadiazine-3-carbamic acid, methyl ester
1-(3-furylcarbamoyl)-2,1,4-benzothiadiazine-3-carbamic acid, methyl ester
1-(phenylcarbamoyl)-2,1,4-benzothiadiazine-3-carbamic acid, methyl ester
1-(α-naphthylcarbamoyl)-2,1,4-benzothiadiazine-3-carbamic acid, methyl ester
1-(p-tolylcarbamoyl)-2,1,4-benzothiadiazine-3-carbamic acid, methyl ester
1-(p-butylphenylcarbamoyl)-2,1,4-benzothiadiazine-3-carbamic acid, methyl ester
1-(p-methoxyphenylcarbamoyl)-2,1,4-benzothiadiazine-3-carbamic acid, methyl ester
1-(p-butoxyphenylcarbamoyl)-2,1,4-benzothiadiazine-3-carbamic acid, methyl ester
1-(o-fluorophenylcarbamoyl)-2,1,4-benzothiadiazine-3-carbamic acid, methyl ester
1-(m-bromophenylcarbamoyl)-2,1,4-benzothiadiazine-3-carbamic acid, methyl ester
1-(p-chlorophenylcarbamoyl)-2,1,4-benzothiadiazine-3-carbamic acid, methyl ester
1-(p-cyanophenylcarbamoyl)-2,1,4-benzothiadiazine-3-carbamic acid, methyl ester
1-(p-nitrophenylcarbamoyl)-2,1,4-benzothiadiazine-3-carbamic acid, methyl ester
1-(methylcarbamoyl)-2,1,4-benzothiadiazine-3-carbamic acid, methyl ester
1-(butylcarbamoyl)-2,1,4-benzothiadiazine-3-carbamic acid, methyl ester
1-(dodecylcarbamoyl)-2,1,4-benzothiadiazine-3-carbamic acid, methyl ester

EXAMPLE 5

Preparation of 1-acetyl-2,1,4-benzothiadiazine-3-carbamic acid, methyl ester

Four and forty-six hundredths parts of 1H-2,1,4-benzothiadiazine-3-carbamic acid, methyl ester is dissolved in 89 parts of tetrahydrofuran and the solution treated, portionwise, with 1.57 parts of acetyl chloride, with stirring and cooling to 20–25° C. during the addition. The mixture is stirred for about 2 hours more at ambient temperature, filtered, and the filtrate evaporated under reduced pressure to a brown oil. The oil solidifies on being stirred with diethyl ether.

The solid is dissolved in methylene chloride and the solution treated with hexane to precipitate solid, which is washed with methanol and ether to leave the title product as a white solid; M.P. 191.5–193° C.

Substitution of butyryl chloride for acetyl chloride in the above example gives 1 - butyryl - 2,1,4 - benzothiadiazine - 3 - carbamic acid, methyl ester; M.P. 122–124° C.

Substitution of hexanoyl chloride for acetyl chloride in Example 5 gives 1 - hexanoyl - 2,1,4 - benzothiadiazine-3-carbamic acid, methyl ester; M.P. 96° C.

By replacing the acetyl chloride in the above example with the appropriate chloroformate, the following compounds are prepared.

1-(methoxycarbonyl)2,1,4-benzothiadiazine-3-carbamic acid, methyl ester
1-(dodecyloxycarbonyl)-2,1,4-benzothiadiazine-3-carbamic acid, methyl ester
1-(allyloxycarbonyl)2,1,4-benzothiadiazine-3-carbamic acid, methyl ester
1-(phenyloxycarbonyl)-2,1,4-benzothiadiazine-3-carbamic acid, methyl ester
1-(benzyloxycarbonyl)-2,1,4-benzothiadiazine3-carbamic acid, methyl ester
1-(cyclohexyloxycarbonyl)-2,1,4-benzothiadiazine-3-carbamic acid, methyl ester
1-stearoyl-2,1,4-benzothiadiazine-3-carbamic acid, methyl ester.

EXAMPLE 6

Preparation of 1-(o-nitrophenylthio)-2,1,4-benzothiadiazine-3-carbamic acid, methyl ester Four and forty-six hundredths parts of 1H-2,1,4-benzothiadiazine - 3 - carbamic acid, methyl ester is dissolved in 89 parts of tetrahydrofuran. Then 1.58 parts of pyridine is added, followed by 3.79 parts of o-nitrobenzenesulfenyl chloride. The temperature is kept below 25° C. by a water bath. After about 45 minutes the reaction mixture is filtered and the filtrate is evaporated under reduced pressure to leave a residual dark brown oil, which affords solid on treatment with warm methanol. The solid is dissolved in about 40 parts of tetrahydrofuran; hexane is added to the cloud point and a little oil is allowed to precipitate; and methanol is added to clarify the solution but leave the precipitated oil undissolved. Decantation of the supernatant liquid, followed by cooling it to about −10° C. causes precipitation of the title product as a yellow solid, which is isolated by filtration. This product exhibits a melting point of 151–153° C.

By replacing the o-nitrobenzenesulfenyl chloride of the above example with the appropriate sulfenyl chloride, the following compounds are prepared.

1-(1,1,2,2-tetrachloroethylthio)-2,1,4-benzothiadiazine-3-carbamic acid, methyl ester
1-(methylthio)-2,1,4-benzothiadiazine-3-carbamic acid, methyl ester
1-(ethylthio)-2,1,4-benzothiadiazine-3-carbamic acid, methyl ester
1-(trichloromethylthio)-2,1,4-benzothiadiazine-3-carbamic acid, methyl ester
1-(trifluoromethylthio)-2,1,4-benzothiadiazine-3-carbamic acid, methyl ester 1-(phenylthio)-2,1,4-benzothiadiazine-3-carbamic acid, methyl ester
1-(p-tolylthio)-2,1,4-benzothiadiazine3-carbamic acid, methyl ester
1-(o-nitrophenylthio)-2,1,4-benzothiadiazine-3-carbamic acid, methyl ester
1-(pentachlorophenylthio)-2,1,4-benzothiadiazine-3-carbamic acid, methyl ester
1-(p-chlorophenylthio)-2,1,4-benzothiadiazine-3-carbamic acid, methyl ester
1-(p-methoxyphenylthio)-2,1,4-benzothiadiazine-3-carbamic acid, methyl ester
1-(benzylthio)-2,1,4-benzothiadiazine-3-carbamic acid, methyl ester As mentioned previously, it has been found that the compounds of the invention possess outstanding fungicidal activity and give good control of mites when employed to prevent or mitigate damage to plants and inanimate organic materials. The paragraphs which follow describe in more detail the utility of this invention.

The compounds of the invention control a wide variety of fungus diseases of foliage, fruit, stems and roots of growing plants without damage to the host. Fruits, tubers, bulbs, roots, seeds and other plant parts harvested for food, animal feed or for other purposes are protected from fungus deterioration during processing, distribution and storage. Seeds, tubers, cuttings and other plant propagation materials are protected from fungus attack during handling and storage, as well as in the soil after planting. Wood, fabric, fiber board, paper and other industrial materials are protected from unsightly stain and destructive decay caused by fungi. Luggage, shoes, shower curtains, carpets, mats, clothing and other useful household, public or industrial items are protected from rot, fungus stains and mold growth. Painted surfaces are protected from stain and discoloration by incorporation of a compound of this invention in the plant formulation.

The many fungi against which the compounds of this invention are active may be represented by, but is not intended to be limited to, the following: *Venturia inaequalius*, which causes apple scab; *Podosphaera leucotricha*, which causes powdery mildew on apple; *Uromyces phaseoli*, which causes bean rust; *Cercospora apii*, which causes early blight of celery; *Cercospora beticola*, which causes leaf spot of sugar beets; *Sclerotinia sclerotiorum*, which causes rot of vegetable crops, such as lettuce, beans, carrots, and celery; *Colletotrichum* spp., which causes anthracnose of fruits and vegetables, such as beans, tomatoes and coffee; *Septoria apii*, which causes late blight of celery; *Mycosphaerella musicola*, which causes Sigotoka disease of banana; *Piricularia* sp., which causes Johnson spot on banana; *Erysiphe cichoracearum*, which causes powdery mildew on cantaloupe and other cucurbit crops; *Penicillium digitatum, Phomopsis* spp., and *Diplodia natalensis*, which causes fruit rots on citrus; *Ceratostomella ulmi*, which causes Dutch elm disease; *Sphaerotheca humuli*, which causes powdery mildew on roses; *Diplocaopon rosae*, which causes black spot on roses; *Ramularia* sp., which causes leaf spots on ornamental plants; *Botrytis cinerea*, which causes blossom and fruit rots of ornamentals, fruits and vegetables; *Uncinula necator*, which causes powdery mildew on grapes; *Guignardia bidwellii*, which causes grape black rot; *Melonconium fuligineum*, which causes white rot of grapes; *Coccomyces hiemalis*, which causes cherry leaf spot; *Cytospora* sp., which cause cankers of trees; *Cladosporium carpophilum*, which causes peach scab; *Fusicladium effusum*, which causes pecan scab; *Erysiphe cichoracearum*, which causes powdery mildew of cucumber; *Erysiphe graminis*, which causes powdery mildew on cereals; *Monolinia (Sclerotinia) laxa* and *M. fructicola*, which cause brown rot of stone fruits, such as peaches, cherries and apricots; *Pseudopeziza ribes*, which causes leaf spot on gooseberry; *Piricularia oryzae*, which causes rice blast; *Puccinia vecondita, P. coronata* and *P. glumarum*, which cause leaf rusts of wheat, oats and grasses, respectively; *Puccinia graminis tritici*, which causes stem rust of wheat; *Claviceps purpurea*, which causes ergot of rye and grasses; *Aspergillus niger*, which causes cotton boll rot as well as decay following wounding in many plant tissues; *Aspergillus flavus*, which causes mold growth on peanuts, as well as on other food and field materials; *Aspergillus terreus*, which is common in soil and attacks vegetable matter; *Tilletia caries* and other Tilletia species, which cause common bunt of wheat; *Ustilago tritici, Ustilago nigra, Ustilago avenae* (and other Ustilago species), which causes loose smut of wheat, barley, and oats, respectively; *Urocystis tritici* and other Urocystis species, which cause loose smut of wheat; *Sphacelotheca sorghi*, which causes covered smut of sorghum; *Ustilago hordei* and *Ustilago kolleri*, which causes covered smut of barley and oats, respectively; *Pithomyces chartorum*, which is present in turf, pastures, and other grassy areas and is known to have several secondary effects; *Gloeodes pomigena*, which causes sooty blotch on apples; *Physalospora obtusa*, which causes black rot on apples; *Microthyriella rubi*, which causes flyspeck on apples; various species of Rhizoctonia, Fusarium and Verticillium present in soil and attacking the roots or other underground parts and the vascular system of a variety of plants; various species of Penicillium growing on such things as fabric, fiber board, leather goods and paint; species of Myrothecium attacking such items as shower curtains, carpets, mats and clothing.

The mite control activity of the compounds of this invention is useful in preventing the development of damaging populations of mites or in causing the gradual reduction of existing populations. The movement of mites is limited. Thus, an increase in population or the continuation of a high population in a particular locus depends largely upon the hatching of eggs and successful development of the young mites present in that locus.

Mite eggs do not hatch to produce living young if they are laid by a female mite that has been in contact with one of these compounds, or are laid by a female mite that is ingesting or has recently ingested food such as plant juices containing one of these compounds. Furthermore, the number of eggs laid is significantly reduced. This interference with the laying and hatching of eggs prevents the population from increasing significantly beyond that present at the time of treatment. Also, this action, along with the high natural mortality of adults, can largely eliminate mites from an already infested area over a relatively short period of time. Further, as long as the compounds are present on the surface the mites occupy or remain in their food supply, new populations cannot develop.

Many species of mites which cause damage to fruits, field crops, vegetables, and ornamentals under a wide variety of circumstances, are controlled by the compounds and methods of this invention. The extent of the practical utility of the mite control obtained is represented by, but is not intended to be limited to, the following listing of specific susceptible mites along with the types of damage that they can cause: *Panonychus ulmi* (European red mite) and *Tetranychus telarius* (two-spotted mite) which are commonly called "orchard mites;" these mites attack a great many deciduous tree fruits including apples, pears, cherries, plums and peaches; *Tetranychus atlanticus* (Atlantic or strawberry mite), *T. cinnabarinus* (carmine spider mite) and *T. pacificus* (Pacific mite); these mites attack cotton and numerous other crop plants; *Paratetranychus citri* (citrus red mite) and others which attack citrus; *Bryobia praetiosa* (clover mite) which attacks clover, alfalfa and other crops; *Phyllocoptruta oleivora*, the citrus rust mite; *Aceria neocynodomis* which attacks grasses and other plants; *Tyrophagus lintneri* which is a serious pest in stored foods and on cultivated mushrooms and *Lepidoglyphus destructor* which injures Kentucky bluegrass seed in storage.

The compounds of this invention when applied by certain of the methods of this invention enter and move freely within plants, i.e., they are systemsic. Thus both fungi and mites can be controlled in plants in parts well removed from the point of application. In view of this activity the compounds can be applied to seeds; thus the treatment of cucumber seeds with a few grams per 50 kilograms of seed of a compound of this invention provides control of powdery mildew (*Erysiphe cicoracearum*) and spider mites such as *Tetranychus urticae* on the resulting plants for prolonged periods of time. Applications to soil also provide control of certain foliage diseases and mites on plants growing in the treated soil. Spray or dust treatments of plant foliage and stems impart protection against both fungi and mites to other parts of the plant not actually sprayed and to new foliage developing later.

There are important practical advantages associated with the use of an effective systemic pesticide. Thus successful application to see as described above, results in great savings in chemical and application costs. Soil applications which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the original spray application. This is of particular importance with plants of dense growth character resisting the intrusion of the spray and also to tall plants, such as shade trees, where the spray will not reach to the top.

An additional valuable characteristic of the compounds of this invention is their ability to prevent the spread or to kill fungus infection already established within a plant; i.e. they are curative. Thus, the compounds need not be applied until after conditions develop which permit the actual initiation of fungus attack. This means that, under some circumstances, it is possible to avoid applying any chemical during the entire life of the crop. In other cases, only a part of the normal full schedule of pesticide is required.

Therefore, great savings both in chemical cost and application labor are possible with compounds capable of systemic and curative performance. Another saving is afforded by the compounds of this invention through the fact that both fungi and mites are controlled by applications of a single chemical.

The compounds of this invention provide protection from damage caused by fungi, mites or both when applied to the proper locus by the methods described hereinafter and at a sufficient rate to exert the desired fungicidal and mite chemosterilant effect. The rates which will give the desired effect will be labeled an "effective amount" and are described in detail in the following paragraphs.

The compounds of the invention are especially suited for the protection of living plants such as fruit-bearing trees, nut-bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweet potatoes, tobacco, hops, turf and pasture.

Living plants may be protected from fungi and mites by applying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Preferred rates for application of the compounds of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs or other plant reproductive parts, range from 0.03 to 6000 grams of active compound of this invention per 50 kilograms of planting material treated. More preferred rates are in the range of 0.3 to 3000 grams of active compound per 50 kilograms. The most preferred rates are in the range of 2.8 to 1500 grams per 50 kilograms.

Applications are made from dusts, slurries or solutions. Such treatments protect the treated parts themselves from damage due to fungi, mites, or both, and in addition, impart extended protection against both types of pests to the resulting new plants.

Preferred rates for application of the compounds of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amount within this range depends upon a number of variables which are well known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,000 grams of active ingredient per 380 liters of water or other liquid carrier. More preferred rates are in the range of 4.5 to 9,000 grams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, foilage roots and the like, harvested for food or feed, are protected from decay and other deterioration caused by fungi or mites during processing, distribution and storage by treatment with an active compound of this invention. The plant parts to be so protected can be dipped in a liquid bath containing the active ingerdient, dusted with a finely divided preparation of the active ingredient, sprayed, misted with an aerosol containing the compound, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingerdient. More preferred rates are in the range of 0.1 to 5% and the most preferred rates are in the range of 0.2 to 2.5%.

Wood, leather, fabric, fiber board, paper and other industrial materials of an organic nature can be protected from decomposition or discoloration by fungi and infestation by mites by coating, incorporating or impregnating with an effective amount of one or more of the compounds of this invention. The coating can be accomplished by dipping, spraying, flooding, misting (as with an aerosol)

or dusting the material to be protected with a suitable composition containing the active ingredient. The preferred use rates for the active ingredient in the treating preparation actually applied to the material to be protected are in the range of 0.025 to 95% by weight. More preferred rates are in the range of 0.05 to 50%, with them ost preferred rates being in the range of 0.1 to 25%.

Where incorporation or impregnation procedures are to be employed, use rates may be expressed in terms of the amount of active ingredient introduced into the material to be protected. The preferred use rates for these types of applications are in the range of 0.001 to 30 percent by weight of active ingredient in the final product. More preferred rates are in the range of 0.005 to 15% with the most preferred rates being in the range of 0.01 to 7%.

Luggage, shoes, shower curtains, carpets, mats, clothing and other useful household, public or industrial items are protected from rot, fungus stains and unsightly mold growth as well as infestation by mites by the active compounds of this invention. Again, either surface or deep protection can be obtained. Surface treatment is by dips, washes, sprays, aerosols or dust applications. Deep treatment is accomplished by penetrating solutions. Sprays, dips and washes contain the active compound of the invention at rates of 10 to 55,000 parts per million. Fluids for aerosol application and dusts contain 0.1 to 20% by weight. Penetrating solvent solutions contain an amount of the active ingredient that results in a deposit of 5 to 20,000 parts per million in the material to be protected.

Painted surfaces can be protected from unsightly stain and mold growth by incorporating in the paint formulation, prior to application, 5 to 20,000 parts per million of an active compound of this invention. More preferred rates are in the range of 10 to 10,000 parts per million and the most preferred rates are in the range of 20 to 5,000 parts per million. Such treatments with the compounds of this invention also protect the paint while still in the can from deterioration by fungi.

Damage by mites to stored organic products such as grain, seed, bulbs, tubers, meat or animal hides is kept to a minimum by treating the floors, walls, portions, and other parts of warehouses or other structures with one or more of the active compounds. Applications are made by the use of dusts, sprays, or aerosols with preferred use rates in the range of 0.5 to 1,000 grams of the active compound of this invention per 93 square meters of surface to be kept free of excessive mite populations.

As was previously set forth, the compounds of this invention are especially suited for use on living plants. Application to the foliage, stems and fruit of plants at the rate indicated above is generally accomplished by employing sprays, dusts or aerosols containing the proper amount of active ingredient. For the control of mites and fungi which are regularly present, applications often start prior to the time that the problem actually appears and continue on a pre-determined schedule. Such a procedure is termed "preventive" or "protective."

With the compounds of this invention, successful control of plant diseases can also be accomplished by applications made after they are present. Fungus mycelia within the plant tissue are actually skilled. This approach or effect is termed "curative" or "eradicant" and permits the user to realize considerable savings.

Curative control of plant diseases with the compounds of this invention is enhanced if the treated plant parts are moist for one or more periods of 2 to 12 hours each soon after the active compound is applied. Often the slow drying of an original spray treatment or naturally occurring rains, mists, fogs or dews will accomplish this. Under other circumstances, such as during dry periods or in shelters such as greenhouses, it is necessary to keep the plants moist by some special effort for best results.

When the compounds of this invention are applied, their activity can be enhanced by using certain additives, for example in the water in which the fungicide is dispersed. These additives can be surface-active agents, oils, humectants, enzymes, carbohydrates, and organic acids. They improve the performance on tubers, on foliage, in treatments used for dip application to roots of living plants, in liquids used for injection into the roots or stems of living plants, or in mixtures used to treat fruits, tubers, bulbs, roots and the like after harvest.

The pressures of an expanding world population, together with the need for more economical agricultural practices have resulted in earlier harvesting of grains, including corn. Frequently the grain is stored or sold to grain elevators without proper drying. Spoilage of the grain under these conditions may be quite rapid, with the formation of toxins and other substances that are very harmful or fatal when fed to animals. Safe, effective feed additives that combat spoilage are thus of great importance to agriculture.

The compounds of this invention can be used to prevent the spoilage of animal feeds. In particular, when mixed with the feed, they provide more efficient and longer lasting protection without harm of injury to livestock that consume it. The compounds of this invention can be conviently formulated for this use in a number of the ways previously disclosed and these formulations may be mixed directly with mixed feed, newly harvested hay and newly harvested grain. These compounds effectively prevent the spoilage of corn, sorghum, wheat, barley, oats, rye and other grains that may be used as livestock feed.

Under normal conditions, these compounds may be incorporated into feeds at rates of from 0.01% to 0.25% with excellent results. Higher rates may be required under very damp conditions.

COMPOSITIONS

Compositions of the present invention can be prepared by mixing at least one of the compounds of Formula I with pest control adjuvants or modifiers to provide compositions in the form of dusts, granules, pellets, water-dispersible powders, high-strength concentrates, aqueous dispersions or emulsions, and solutions or dispersions in organic liquids.

Thus, the compounds of Formula I can be used with adjuvants such as carriers or diluents, e.g., a finely divided solid; granular solids; an organic liquid or water; wetting agents; dispersing agents; emulsifying agents; or any suitable combination of these.

Compositions of the invention, especially liquids and wettable powders, contain as a conditioning agent one or more surface-active agents, sometimes called surfactants, in amounts sufficient to render a given composition containing the compounds of Formula I readily dispersible in water or in oil.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type.

Suitable surfactants are alkanolamides, alkyl sulfonates, sulfated and sulfonated amines and amides, betaine derivatives, diphenyl sulfonate derivatives, ethoxylated alcohols, ethoxylated alkyl phenols, ethoxylated amines and amides, ethoxylated fatty acids, ethoxylated fatty esters and oils, fatty glycol, glycerol and other esters, imidazoline type surfactants, isethionates, lanolin derivatives, lecithin derivatives, lignin derivatives, monoglycerides and derivatives, phosphate esters and phosphate derivatives, quaternaries and derivatives, sarcosine derivatives, sorbitan and sorbitol derivatives, sulfosuccinates, alcohol sulfates, ethoxylated alcohol sulfates of ethoxylated alcohols, sulfonates of naphthalene and alkylnaphthalenes, sulfated ethoxylated alkyl phenols, sulfated fatty esters, sulfated and sulfonated oils and fatty acids, condensed naphthalene sulfonates, alkylbenzene sulfonates, petroleum sulfonates, taurates, tertiary amine oxides, thio and mercapto derivatives, vinyl and other polymeric resin surfactants, alpha olefin sulfonates and sucrose esters. Such surface-active agents are set forth, for example, in "Detergents and Emulsifiers" 1968 Annual by John W. McClutcheon, Inc.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions have a greater effectiveness than can be expected from a consideration of the activity of the components used separately. When used at high rates it is preferred that the surfactant be present in the range of one-fifth to five parts surfactant for each one part of active agent.

In the compositions of this invention, such as wettable powders, suspensions, and slurries, it is preferred to have the active compounds present in the proper amount and in a fine particle size in order to obtain optimum activity. The desired fine particle size can be obtained, for example, by fine grinding. Preferred grinders to obtain such fine particles include ball or pebble mills, sand mills, air mills, pin or stud mills, "Attritors," whizzer mills, ring-roller mills, disk mills and the like. Regardless of the type of grinder used, the grinding process must be carried out under conditions to assure that the product which is made shall have an adequately fine particle size. Particle size classifiers can be used in conjunction with the grinders to help meet this requirement. The use of a grinding aid also helps obtain the desired particle size.

These very finely divided forms of the active ingredient are surprisingly more active than formulations of conventional particle size. The finely divided form has improved penetration into the plants and thus enhances the curative effect. These fine particles also have improved solubility characteristics. Further, these forms are stable and have good residual activity, thus providing preventive control. With many fungicides, a reduction in particle size can lead to problems with phytotoxicity; this is not the case with the finely divided forms of this invention.

By very finely divided form it is meant that the particle size is predominantly less than 5 microns in diameter with at least 40% by weight of the active compound, and preferably 60% by weight, in the form of particles below 2 microns in diameter. The particle size refers to the ultimate particle size as it exists in the spray droplet or dust which contacts the plant. In the dry compositions, or even in the spray slurry before spraying, the fine particles can exist as floccules or aggregates, or agglomerates, in which several fine particles are associated together.

The preferred methods to determine the particle size of the compounds of this invention are by sedimentation analysis in an Andreasen pipette, by microscopic counting, or by analysis with the Coulter Counter®. Other sedimentation methods, including centrifugal sedimentation, may also be employed.

WETTABLE POWDERS

Wettable powders are water-dispersible compositions containing the active material, an inert solid extender, and one or more surfactants to provide rapid wetting and prevent heavy flocculation when suspended in water.

The classes of extenders suitable for the wettable powder formulations of this invention are the natural clays diatomaceous earths, synthetic mineral fillers derived from silica and silicate, calcium carbonates or phosphates, and organic dusts. Most preferred fillers for this invention are attapulgites, kaolinites, diatomaceous earths, montmorillonite clays, finely divided synthetic silicas, synthetic magnesium silicate, sucrose and calcium sulfate dihydrate.

Suitable surfactants for use in such compositions are those listed by J. W. McCutcheon in "Detergents and Emulsifiers" 1968 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are sodium alkybenzene- and alkylnaphthalenesulfonates; sulfated fatty alcohols, long-chain acid esters of sodium isethionate, esters of sodium sulfosuccinate, sulfated or sulfonated fatty acid esters, petroleum sulfonates, and sulfonated vegetable oils. Preferred dispersants are methyl cellulose, polyvinyl alcohol, lignin sulfonates, polyvinyl pyrrolidone derivatives, polymeric alkylnaphthalenesulfonates, sodium naphthalenesulfonate, polymethylene bisnaphthalenesulfonate, and sodium N-methyl-N-(long-chain acid)taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender can be replaced by a corrosion inhibitor or an anti-foaming agent or both.

Thus, wettable powder formulations of the invention will contain from about 20 to 9 weight percent active material, from 0.5 to 5.0 weight percent wetting agent, from 0.25 to 5.0 weight percent dispersant, and from 9.25 to 79.25 weight percent inert extender, as these terms are described above.

When the wettable powder contains a corrosion inhibitor or an anti-foaming agent or both, the corrosion inhibitor usually will not exceed about 1 percent of the composition, and the anti-foaming agent usually will not exceed about 0.5 percent by weight of the composition, both replacing equivalent amounts of the inert extender.

HIGH STRENGTH COMPOSITIONS AND AQUEOUS SUSPENSION CONCENTRATES

High-strength compositions generally consist of 90 to 99.5% active ingredient and 0.5 to 10% of a liquid or solid surfactant such as those described by McCutcheon in "Detergents and Emulsifiers" 1968 Annual. Such high-strength compositions can often be used in a manner similar to the wettable powders but they are also suitable for further formulation.

The aqueous suspension concentrates are prepared by mixing together and sandgrinding an aqueous slurry of essentially water-insoluble active ingredient in the presence of dispersing agents. Suitable methods and formulations for preparing such compositions are disclosed in U.S. Pats. 3,157,486 and 3,060,084. Thus there is obtained a concentrated slurry of very finely divided particles in which the active ingredient is substantially all below 5 microns in size. This concentrated aqueous suspension is characterized by its extremely small particle size so that upon diluting and syraying, a very uniform coverage is obtained.

These aqueous suspension concentrates will contain from 15 to 50% of active ingredient, from 45 to 80% water with the remainder made up of surfactants,, corrosion inhibitors, and suspending agents.

Suspensions in organic liquids can be prepared in a similar manner such as by replacing the water with, for example, mineral oil.

DUSTS

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dusts of this invention are micaceous talcs, pyrophyllite, dense kaolin clays, tobacco dust, sucrose, calcium carbonate, calcium sulfate, and ground calcium phosphate rock such as that known as "Phosphodust," a trademark of the American Agricultural Chemical Company.

Preferred grinding aids are attapulgite clay, diatomaceous silica, synthetic fine silica, and synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute up to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 2 to 20 weight percent active material, 0 to 50 weight percent absorptive filler, 0 to 1.0 weight percent wetting agent, and the remainder, e.g. about 30 to 98 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

EMULSIFIABLE OILS

Emulsifiable oils are usually solutions of active material in non-water miscible solvents together with a surfactant.

Emulsifying agents most suitable for the emulsifiable oil compositions of this invention are long-chain alkyl or mercaptan polyethoxy alcohols, alkylaryl polyethoxy alcohols, sorbitan and sorbitol fatty acid esters, polyoxyethylene ethers with sorbitan and sorbitol fatty acid esters, polyethylene glycol esters with fatty or rosin acids, fatty alkylol amide condensates, calcium and amine salts of fatty alcohol sulfates, oil-soluble petroleum sulfonates, phosphate esters or, preferably, mixtures of these emulsifying agents. Such emulsifying agents will comprise from about 1 to 10 weight percent of the total composition. As described above, however, up to 5 parts of emulsifying agent for each part of benzothiadiazine can be used.

Thus, emulsifiable oil compositions of the present invention will consist of from about 10 to 35 weight percent active material, about 64 to 85 weight percent solvent, and about 1 to 10 weight percent emulsifier, as these terms are defined and used above.

In some instances the oil solution can be intended merely for extension with other oils, such as the non-phytotoxic spray oils. In this instance the emulsifying agents can be omitted and can be replaced by additional solvent.

GRANULES AND PELLETS

Granules and pellets are physically stable, particulate compositions containing a compound of Formula I which adheres to, or is distributed through, a basic matrix of a coherent, inert carrier with macroscopic dimensions. In order to aid leaching of the active ingredient from the granule or pellet, a surfactant can be present.

For the compounds of this invention, the inert carrier is preferably of mineral or organic origin, and the surfactant is a compound known in the art as a wetting agent. Such compounds are listed by J. W. McCutcheon in "Detergents and Emulsifiers" 1968 Annual.

For the granule compositions of this invention, most suitable carriers are of two types. The first are porous, absorptive, preformed granules, such as preformed and screened granular attapulgite, heat expanded, granular, screened vermiculite or granular corn cobs. On either of these, a solution of the active agent can be sprayed or a powder can be spread on the surface and attached thereto with a binder. Such granular compositions can contain up to 25 weight percent of the total weight as active ingredient, but more frequently such compositions contain no more than 10% active. The second types, which are also suitable for pellets, are initially powdered kaolin clays, hydrated attapulgite, or bentonite clays in the form of sodium, calcium or magnesium bentonites. Water-soluble salts, such as sodium salts or sucrose may also be present and aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component, but more frequently a concentration of about 10 weight percent is desired for optimum distribution. The granular compositions of this invention are most useful in a size range of 30–80 mesh. (0.177–0.59 mm.)

The most suitable wetting agents for the granular compositions of this invention depend upon the type of granule used. When preformed granules are sprayed with active material in liquid form, the most suitable wetting agents are non-ionic, liquid wetters miscible with the solvent. These are compounds more generally known to the art as emulsifiers, and comprise alkylaryl polyether alcohols, alkyl polyether alcohols, polyoxyethylene sorbitan or sorbitol fatty acid esters, polyethylene glycol esters with fatty or rosin acids, fatty alkylol amide condensates, oil-soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 2 to 30 weight percent active material, about 0 to 5 weight percent wetting agent, and about 60 to 98 weight percent of one or more diluent and carrier, as these terms are used herein.

ULTRA-LOW-VOLUME APPLICATIONS

While conventional applications of sprayable formulations have usually been made in a dilute form (for example, at a rate of about 200 liters per hectare or more), the compounds of this invention can also be applied at higher concentrations in the typical "ultra-low-volume" (ULV) or "low-volume" (LV) applications from aircraft or ground sprayers. For this purpose wettable powders can be dispersed in small amounts of aqueous or non-aqueous carrier. The suspension or emulsifiable concentrates can be used directly or with minor dilution. Special compositions particularly suitable for ULV applications are solutions or finely divided suspensions in one or more carriers such as dialkylformamides, N-alkylpyrrolidones, dimethyl sulfoxide, water, esters, ketones, glycols, glycol ethers and the like. Other suitable carriers include aromatic hydrocarbons (halogenated and non-halogenated), aliphatic hydrocarbons (halogenated and non-halogenated) and the like.

The compositions of the invention can contain, in addition to the active ingredient of this invention, conventional insecticides, miticides, bactericides, nematocides, fungicides, or other agricultural chemicals such as fruit set agents, fruit thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active compounds.

The additional agricultural chemicals are employed in mixtures or combinations in amounts ranging from one-fifth to twenty times that of the compound or compounds of this invention. The proper choice of amounts is readily made by one skilled in the art of protecting plants from pest depredations.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a-4,7,7a-tetrahydroindane;
1,2,3,4,10,10-hexachloro-6,7-epoxy-1,4,4a-5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1 (or 3a), 4,5,6,6,8,8-heptachloro-3a-4,7,7a-tetrahydro-4,7-methanoindene;
1,1,1-trichloro-2,2-bis(p-methoxyphenyl)ethane(methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl N-methylcarbamate ("Sevin®") carbaryl;
methylcarbamic acid, ester with phenol, 4-(dimethylamino-3,5-dimethyl;
methylcambamic acid, ester with 1,3-dithiolan-2-one oxime;
O,O-diethyl O-(2-isopropyl-4-methylpyrimid-6-yl) thiophosphate;
O,O-dimethyl 1-hydroxy-2,2,2-trichloroethylphosphonate (diazinon);
O,O-dimethyl S-(1,2-dicarbethoxyethyl) dithiophosphate (malathion);
O,O-dimethyl O-p-nitrophenyl thiophosphate (methylparathion);
O,O-dimethyl O-(3-chloro-4-nitrophenyl) thiophosphate;
O,O-diethyl O-p-nitrophenyl thiophosphate (parathion);
dl-2-cyclopentenyl-4-hydroxy-3-methyl-2-cyclopenten-1-one chrysanthemate;
O,O-dimethyl O-(2,2-dichlorovinyl) phosphate (DDVP);
mixture containing 53.3% "Bulan," 26.7% "Prolan" and 20.0% related compounds;
O,O-dimethyl O-(2,4,5-trichlorophenyl) phosphorothioate;
O,O-dimethyl S-(4-oxo-1,2,3-benzotriazine-3(4H)-yl-methyl)-phosphorodithioate ("Guthion"® azinphos-methyl);
bis(dimethylamino)phosphorous anhydride;
O,O-diethyl O-(2-keto-4-methyl-7-a'-pyranyl) thiophosphate;
O,O-diethyl (S-ethylmercaptomethyl) dithiophosphate;
calcium arsenate;
sodium aluminofluoride;
dibasic lead arsenate;
2'-chloroethyl 1-methyl-2-(p-tert-butylphenoxy)ethyl sulfite;
azobenzene;
ethyl 2-hydroxy-2,2-bis(4-chlorophenyl)acetate;
O,O-diethyl O-[2-(ethylmercapto)-ethyl] thiophosphate (Systox® demeton);
2,4-dinitro-6-sec-butylphenol;
toxaphene;
O-ethyl O-p-nitrophenyl benzenethiophosphonate (EPN®);
4-chlorophenyl 4-chlorobenzenesulfonate;
p-chlorophenyl phenyl sulfone;
tetraethyl pyrophosphate (TEPP);
1,1-bis(p-chlorophenyl)ethanol;
1,1-bis(chlorophenyl)-2,2,2-trichloroethanol (Kelthane® dicofol);
p-chlorophenyl p-chlorobenzyl sulfide;
bis(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
2-(o-hydroxyphenyl)-1,3-dithiolane methylcarbamate ester;
2-(o-hydroxyphenyl)-1,3-dioxolane methylcarbamate ester;
dl-2-allyl-4-hydroxy-3-methyl-2-cyclopenten-1-one esterified with a mixture of cis and trans dl-chrysanthemum monocarboxylic acids;
butoxypolypropylene glycol;
ethyl 2-hydroxy-2,2-bis(4-chlorophenyl)acetate (chlorobenzilate);
p-dichlorobenzene;
2-butoxy-2'-thiocyanodiethyl ether;
naphthalene;
methyl O-carbamoylthiolacetohydroxamate;
1,1-dichloro-2,2-bis(p-ethylphenyl)ethane;
methyl O-(methylcarbamoyl)thiolacetohydroxamate (methomyl);
p-dimethylaminobenzenediazo sodium sulfonate;
2-heptadecylimidazoline acetate (glyodin);
tetraalkylthiuram disulfides such as tetramethylthiuram disulfide or tetraethylthiuram disulfide;
sulfur;
metal salts of ethylenebisdithiocarbamic acid or propylene-bisdithiocarbamic acids, e.g. manganese, zinc, iron and sodium salts (maneb or zineb);
pentachloronitrobenzene;
2-(1-methylheptyl)-4,6-dinitrophenyl crotonate and other nitrophenol derivatives;
N-dodecylguanidine acetate (dodine);
N-(trichloromethylthio)phthalimide;
N-(trichloromethylthio)tetrahydrophthalimide (captan);
cis-N-[(1,1,2,2-tetrachloroethyl)thio]-4-cyclohexene-1,2-dicarboximide;

2,4-dichloro-6-(o-chloroaniline)-s-triazine
  ("Dyrene");
bis(4-chlorophenyl)-3-pyridylmethanol;
3,3'-ethylenebis(tetrahydro-4,6-dimethyl-2H,1,3,5-
  thiodiazine-2-thione);
triphenyltin hydroxide;
1,4-dichloro-2,5-dimethoxy benzene;
triphenyltin acetate;
metal (e.g. iron, sodium and zinc), ammonium and
  amine salts of dialkyldithiocarbamic acids;
2,6-dichloro-4-nitroaniline;
tetrachloronitroanisole;
hexachlorobenzene;
hexachlorphene;
sulfur;
tetrachloroquinine;
2,3-dichloro-1,4-naphthoquinone;
cupric hydroxide;
tribasic copper sulfate;
fixed copper;
1,2-dibromo-3-chloropropene;
1,2-dibromo-3-chloropropane;
dichloropropane-dichloropropene mixture;
ethylene dibromide;
chloropicrin;
sodium monomethyldithiocarbamate;
tetrachloroisophthalonitrile;
1-benzimidazolecarboxylic acid, 2-carboxyamino,
  dimethyl ester;
2,3-dihydro-5-carboxyanilide-6-methyl-1,4-oxathiin-
  4,4-dioxide;
streptomycin or other antibiotics;
2-(2,4,5-trichlorophenoxy)propionic acid;
p-chlorophenoxyacetic acid;
1-naphthaleneacetamide; and
N-(1-naphthyl)acetamide.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

These compounds can also be used to improve the performance of other feed additives, such as sodium propionate, by mixing the two additives directly, or by adding them separately to the feed to be protected.

To provide further illustrations of this invention, the following examples are given. All proportions are given by weight unless otherwise specified.

EXAMPLE 7

|  | Percent |
|---|---|
| 1H - 2,1,4 - benzothiadiazine - 3 - carbamic acid, methyl ester | 50 |
| Sodium alkylnaphthalenesulfonate | 3 |
| Oleic ester of sodium isethionate | 2 |
| Diatomaceous silica | 45 |

The above ingredients are blended and hammer milled. This mixture is then ground in a fluid energy mill until essentially all particles of active ingredient are 5 microns or less in size.

The formulation of this example is useful for the control of apple scab incited by the fungus (*Venturia inaequalis*) and powdery mildew incited by the fungus (*Podosphaera leucotricha*). In addition populations of the European Red mite (*Panonychus ulmi*) are suppressed by this formulation. This is demonstrated by a field test in which alternate trees in an orchard of Rome apples are sprayed to the point of run-off with an aqueous suspension at a concentration of 500 p.p.m. of the active ingredient. Sprays are applied at intervals of two weeks from bud break until the end of the season. The remaining trees in the orchard are left unsprayed.

In early September all trees are carefully examined. Trees that were sprayed with the compound of this invention are healthy and free of mite infestation and fungus damage. The fruit on the sprayed trees is unblemished and of good size. The foliage of the unsprayed trees, on the other hand, is heavily infested with the apple scab fungus and the powdery mildew fungus. Also the leaves of the unsprayed plants are badly infested with European red mites. The fruit on the unsprayed trees is spotted with scab and of small size.

EXAMPLE 8

|  | Percent |
|---|---|
| 1 - (p - toluenesulfonylcarbamoyl) - 2,1,4 - benzothiadiazine - 3 - carbamic acid, methyl ester | 30 |
| Dioctyl ester of sodium sulfosuccinic acid | 3 |
| Methyl cellulose | 1 |
| Kaolin | 66 |

After blending and micropulverizing the above ingredients, the mixture is ground in a fluid energy mill until essentially all particles of active ingredient are 5 microns or less.

The formulation of this example provides effective control of cherry leaf spot incited by the fungus (*Coccomyces hiemalis*) and of the two spotted mite (*Tetranychus urticae*) on cherry. This is demonstrated by a field test in a uniform cherry orchard of the Montmorency variety. Alternate rows of trees are sprayed to run-off every two weeks with a suspension of the above described wettable powder formulation at a concentration of 500 p.p.m. of active ingredient in water. The remaining trees are left unprotected.

The trees are examined two months after harvest. The trees that had been sprayed with the compound of this invention are green and healthy with all leaves remaining on the trees. At this time the foliage of the unprotected trees is largely discolored due to attack by the leaf spot fungus and the two spotted mite. Further, many of the unprotected trees have been almost completely defoliated by the attack of the two pests.

EXAMPLE 9

|  | Percent |
|---|---|
| 1H - 2,1,4 - benzothiadiazine - 3 - carbamic acid, ethly ester | 70 |
| Partially desulfonated sodium ligninsulfonate | 3 |
| Dioctyl ester of sodium sulfosuccinic acid | 3 |
| Attapulgite | 24 |

The above ingredients are blended and then the particle size of the active ingredient is reduced to about 5 microns or less by grinding the mixture in turn in a pin mill and a fluid energy mill such as micronizer.

The formulation of this example is useful for the control of rose powdery mildew incited by the fungus (*Sphaerotheca humuli*), black spot incited by the fungus (*Diplocarpon rosae*) and the Atlantic mite (*Tetranychus atlanticus*). Control of these pests is demonstrated by a test in which alternate Christian Dior rose bushes are sprayed to run-off at weekly intervals with a suspension of the formulation described above. The concentration of active ingredient is 500 p.p.m. in water containing 500 p.p.m. of a wetting agent, a modified phthalic glycerol alkyd resin ("Triton" B 1956).

After two months of this spray program the effectiveness of the treatment is assessed by visual observation. The treated plants are healthy and growing well with attractive, dark green foliage. The untreated plants, on the other hand, have much foliage discolored, spotted, and deformed due to infection by the rose powdery mildew fungus and defoliated by the black spot fungus. Other foliage on the untreated palnts is yellow due to infestation by the Atlantic mite. Due to the extensive foliar damage, the untreated plants are obviously growing more slowly and are much smaller than the plants protected with the compound of this invention.

EXAMPLE 10

| | Percent |
|---|---|
| 1H-2,1,4-benzothiadiazine-3-carbamic acid, methyl ester | 50 |
| Dioctyl ester of sodium sulfosuccinic acid | 3 |
| Methyl cellulose | 1 |
| Sucrose | 46 |

The above ingredients are blended and ground in the same fashion as in Example 7 to obtain a water-dispersible powder in which essentially all particles of active ingredient are 5 microns or less.

The formulation of this example provides an effective means for control of rice blast incited by the fungus (*Piricularia oryzae*). This is demonstrated by a study in which test plots in a Texas rice field are sprayed with water containing a suspension of the wettable powder described above along with a polyhydric alcohol ester surface-active agent ("Trem" 014). The amount of the wettable powder used is 500 p.p.m. of the active compound of this invention in water. The amount of "Trem" 014 is 500 p.p.m. in the final spray. The spray is applied at weekly intervals at the rate of 1000 liters per hectare. The remainder of the field is left unsprayed.

Three months after the start of the test, the sprayed plots are healthy and growing well. The untreated plots on the other hand, are seriously damaged by the rice blast fungus, which greatly reduces yield.

EXAMPLE 11

The following compounds can be substituted one at a time for 1H-2,1,4-benzothiadiazine-3-carbamic acid, methyl ester of Example 10 in like amount by weight. When formulated and applied in like manner, like results are obtained.

1H-2,1,4-benzothiadiazine-3-carbamic acid, ethyl ester
1H-2,1,4-benzothiadiazine-2-oxo-3-carbamic acid, methyl ester
1-(p-toluenesulfonylcarbamoyl)-2,1,4-benzothiadiazine-3-carbamic acid, methyl ester
1-hexanoyl-2,1,4-benzothiadiazine-3-carbamic acid, methyl ester
1-dodecanoyl-2,1,4-benzothiadiazine-3-carbamic acid, methyl ester

EXAMPLE 12

| | Percent |
|---|---|
| 1H-2,1,4-benzothiadiazine-3-carbamic acid, isopropyl ester | 90 |
| Sodium alkylnaphthalenesulfonate | 6 |
| Oleic ester of sodium isethionate | 4 |

A high-strength composition, suitable for use as a wettable powder or as an ingredient of other compositions, is prepared by blending the above materials and grinding in the same fashion as in Example 7 until essentially all particles of the active component are 5 microns or less.

The formulation of this example is useful for the control of peach scab incited by the fungus (*Cladosporium carpophilum*) and peach brown rot incited by the fungus (*Monolinia laxa*). This is demonstrated by an orchard study in which random Elberta trees in a peach planting are sprayed, starting in the "popcorn" stage of blossom, with the formulation of this example at a concentration of 500 p.p.m. The same trees are sprayed at two-week intervals throughout the season at a rate of 2000 liters per hectare of peach trees. The remaining trees in the planting are left unsprayed.

At the end of the season the treated and untreated trees are examined and compared. The treated trees are heavily laden with large healthy peaches that are attractive to consumers. Conversely, the fruit from the untreated trees are small, fewer in number and the remaining fruit are severely spotted with scab and brown rot and are of reduced market value. Similar compositions can be prepared from the other active compounds of this invention.

EXAMPLE 13

| | Percent |
|---|---|
| 1H-2,1,4-benzothiadiazine-3-carbamic acid, methyl ester | 30 |
| Crude calcium, ligninsulfonate | 15 |
| Hydrated attapulgite | 2 |
| n-Octyl alcohol | 0.1 |
| Phenolic bactericide | 0.2 |
| Water | 52.7 |

The above ingredients are sand ground until essentially all particles of active ingredient are 5 microns or less. This aqueous dispersion may be diluted with an amount of water equivalent to one or two volumes of dispersion for use in ultra-low volume applications or may be diluted a hundred fold or more for conventional spraying or dipping.

The formulation of this example provides effective, long lasting control of citrus blue mold incited by the fungus (*Penicillium digitatum*). This is demonstrated by a test conducted at a commercial citrus packing house in Florida. Six field crates of oranges are selected at random from the grove. Three of these crates of oranges are dipped for three minutes in a water bath containing a concentration of 1000 p.p.m. of the active ingredient of this formulation. A polyhydric alcohol ester surface active agent ("Trem" 014) is present at a rate of 500 p.p.m. of total liquid. The remaining three crates of oranges are dipped in a similar fashion in water with the surface-active agent only. All crates are set aside in a citrus storage house for four weeks.

At the end of the storage period all fruit are removed from the crates and examined for evidence of storage rot. The fruit that are treated with the compound of this invention are protected from the blue mold fungus and are still in a sound marketable condition. The fruit that are treated with the surface-active agent only are 100% rotted by the blue mold fungus.

The other compounds of this invention may be similarly formulated and when used as above give like results.

The following compounds may be substituted one at a time for 1H - 2,1,4 - benzothiadiazine-3-carbamic acid, methyl ester, above, in like amount by weight. When formulated and applied in like manner, like results are obtained.

1H-2,1,4-benzothiadiazine-3-carbamic acid, ethyl ester
1H-2,1,4-benzothiadiazine-3-carbamic acid, isopropyl ester
1-(p-toluenesulfonylcarbamoyl)-2,1,4-benzothiadiazine-3-carbamic acid, methyl ester
1-hexanoyl-2,1,4-benzothiadiazine-3-carbamic acid, methyl ester

EXAMPLE 14

| | Percent |
|---|---|
| 1-(p-toluenesulfonylcarbamoyl) - 2,1,4 - benzothiadiazine-3-carbamic acid, methyl ester | 25 |
| Methyl cellulose | 0.5 |
| Dioctyl ester of sodium sulfosuccinic acid | 1.5 |
| Alkyl phenoxy polyethoxyethanol | 6 |
| Sixty-second viscosity, non-phytotoxic spray oil | 67 |

The above ingredients are sand-ground until essentially all particles of the active component are 5 microns or less. This oil dispersion may be diluted with additional oil for spraying at either ULV or conventional rates or it may be added to water for application.

The formulation of this example is useful in controlling Sigatoka disease of banana incited by the fungus (*Cercospora musae*). This is demonstrated by a field test in which designated areas in a banana plantation are treated with 1000 grams of the active ingredient of this invention per hectare applied in 20 liters of water with a fixed-wing aircraft. The treatment is applied at intervals of 14 days.

Four months after the start of the test the banana plants in the treated plots are free from disease, whereas the untreated plants are heavily damaged by Sigatoka disease.

The following compounds can be substituted one at a time for 1-(p-toluenesulfonylcarbamoyl)-2,1,4-benzothiadiazine-3-carbamic acid, methyl ester above in like amount by weight. Application in like manner gives like results.

1H-2,1,4-benzothiadiazine-3-carbamic acid, methyl ester
1H-2,1,4-benzothiadiazine-3-carbamic acid, ethyl ester
1-(o-nitrophenylthio)-2,1,4-benzothiadiazine-3-carbamic acid, methyl ester
1H-2,1,4-benzothiadiazine-3-carbamic acid, isopropyl ester
1-acetyl-2,1,4-benzothiadiazine-3-carbamic acid, methyl ester
1-(methoxycarbonyl)-2,1,4-benzothiadiazine-3-carbamic acid, methyl ester
1-hexanoyl-2,1,4-benzothiadiazine-3-carbamic acid, methyl ester

EXAMPLE 15

|  | Percent |
|---|---|
| 1H-2,1,4-benzothiadiazine - 3 - carbamic acid, methyl ester | 25 |
| Dimethyl sulfoxide | 75 |

The active ingredient is added to the solvent, and agitation is continued until a homogeneous solution results. This solution is particularly suitable for ULV applications.

The formulation of this example is useful for the control of peanut leaf spot incited by the fungi (*Cercospora personata* and *C. arachidicola*). This control is demonstrated by a field test in southern Alabama in which four one hectare blocks of a peanut planting are selected for uniformity of soil type and ease of aerial treatment. Except for the treatment of two of the blocks of peanut plants with the compound of this invention, all four blocks are treated identically with respect to planting, fertilization, and cultivation. The oil suspension of this formulation is applied undiluted by ULV equipment on a fixed-wing aircraft at a rate of four liters per hectare at two week intervals starting June 1 and continuing until two weeks before harvest.

The effectiveness of the treatment is assessed by weekly sampling of peanut leaves for examination. The untreated plants begin to show the first signs of a continuing buildup of leaf spots by June 21 and before the end of the season, they are almost completely defoliated by the disease, thus reducing yield of marketable peanuts. The plants that are treated with the formulation of this example are free of Cercospora leaf spots and continue to grow until the end of the season, thus increasing yield of peanuts.

Other active compounds of this invention may be formulated and applied in like manner; like results are obtained.

EXAMPLE 16

| | Percent |
|---|---|
| 1H - 2,1,4 - benzothiadiazine-3-carbamic acid, sec-butyl ester | 20 |
| Dimethylformamide | 80 |

The active ingredient is dissolved in the liquid carrier to give a homogeneous solution which is particularly suitable for ULV applications.

The formulation of this example is effective for control of the rice blast fungus (*Piricularia oryzae*). This is demonstrated in a Texas rice field by a test in which half of the rice is treated with the solution of this formulation while the remaining plants are untreated. The undiluted solution is applied at a rate of one liter per hectare using ULV equipment on a fixed-wing aircraft. The spray is applied at weekly intervals during the growing season.

At the end of the test the effectiveness of the treatment of this invention is evaluated by visual estimation of blasted grain heads and by comparison of the grain yield harvested from the treated and the untreated portions of the field. The treated plots grow well all during the season and produce upright grain heads on sturdy plants. The untreated plants, on the other hand are seriously damaged by the rice blast fungus and produce greatly reduced yield.

EXAMPLE 17

| | Percent |
|---|---|
| 1 - (p - toluenesulfonylcarbamoyl) - 2,1,4 - benzothiadiazine-3-carbamic acid, methyl ester | 10 |
| Blend of polyoxyethylene ethers and alkylarylsulfonates | 10 |
| Isophorone | 80 |

An emulsifiable concentrate is prepared from the above ingredients by dissolving the active compound in the solvent and adding the emulsifier. The concentrate can be used directly for ULV applications or can be diluted with water or non-phytotoxic spray oils for either conventional or LV applications.

The formulation of this example is useful for the control of the pecan scab incited by the fungus (*Fusicladium effusum*). This is demonstrated by a test established in a pecan grove of the Mahan variety in southern Georgia in which alternate rows of trees are sprayed by helicopter using ULV equipment. The above formulation is sprayed at a rate of 1000 grams per tree starting when the young leaves have unfolded and continuing until pecans are mature.

The effectiveness of the compound of this invention is evaluated by examining the foliage and nuts from the treated and untreated trees. The foliage and nuts of the treated trees are free from scab lesions and the nuts produced are of the highest quality. The untreated trees show foliage with large black areas on the lower surface of the leaves and the nuts are light weight and contain numerous sunken lesions due to the severe infection by the pecan scab fungus.

EXAMPLE 18

| | Percent |
|---|---|
| 1H-2,1,4-benzothiadiazine - 3 - carbamic acid, ethyl ester | 10 |
| Sodium alkylnaphthalenesulfonate | 1 |
| Diatomaceous silica | 24 |
| Micaceous talc | 65 |

The active ingredient, surfactant, and diatomaceous silica are blended and ground until essentially all particles of the active component are 5 microns or less. A freely flowing dust results from blending this mixture with the talc.

The formulation of this example is effective for the control of the sugar beet leaf spot incited by the fungus (*Cercospora beticola*). This is demonstrated by a test conducted in a sugar beet field in Ohio where a single row is selected for treatment with the dust of this formulation.

After the sugar beets are one month old and a few lesions of *Cercospora beticola* have become evident as spots on the leaves, weekly dust treatments are applied to the selected row. The 10% dust of this formulation is applied to a single row at approximately 20 kilograms per hectare. There is some drift to adjacent rows but the remainder of the field is left untreated. At harvest the foliage is examined and the beets are dug and weighed. The treated row is a vigorous healthy row with lush green foliage and the beets are large and normal. The adjacent rows are spotted with numerous leaf spot lesions and the remainder of the field is almost entirely defoliated. A few young leaves on the untreated beets are still green but all of the older leaves are dried up. Beets from the untreated rows are less than half normal size.

27

Any of the compounds of this invention can be formulated in like manner and applied with similar results.

EXAMPLE 19

| | Percent |
|---|---|
| Wettable powder of Example 7 | 14 |
| Micaceous Talc | 86 |

The above ingredients are blended to give a freely flowing dust.

The formulation of this example is an effective means for protecting sugar cane seed pieces from storage rot incited by the fungi of the genus Fusarium. This is demonstrated by a test in which sugar cane seed pieces that are cut in November are divided into eight lots. Four of these lots are dusted in such a way as to cover all surfaces with the dust of this formulation. The other four lots are dusted with the inert diluent only. All lots are stored under similar conditions until the following February at which time they are examined. The four lots that had been treated with the compound of this invention are in good condition. The four unprotected lots, on the contrary, are so badly rotted by fungi of the genus Fusarium that they cannot be planted.

The following compounds may be substituted one at a time for 1H-2,1,4-benzothiadiazine - 3 - carbamic acid, methyl ester, above, in like amount by weight. When formulated and applied in like manner, like results are obtained.

1H-2,1,4-benzothiadiazine-3-carbamic acid, ethyl ester
1H-2,1,4-benzothiadiazine-3-carbamic acid, isopropyl ester
1-(p-toluenesulfonylcarbamoyl)-2,1,4-benzothiadiazine-3-carbamic acid, methyl ester
1-hexanoyl-2,1,4-benzothiadiazine-3-carbamic acid, methyl ester The other wettable powders of this invention, Examples 8 to 13 inclusive, can be used to prepare similar dusts which can be applied in like manner to give like results.

EXAMPLE 20

| | Percent |
|---|---|
| 1H-2,1,4 - benzothiadiazine-3-carbamic acid, sec-butyl ester | 5 |
| Preformed clay granules, 60–80 mesh (0.17–0.59 mm.) | 95 |

The active component is dissolved in a suitable solvent such as acetone, dimethylformamide, tetrahydrofuran and the like, and this solution is sprayed on the absorptive granules while they are being continuously agitated. After drying, the granules are ready for application.

The formulation of this example is useful for the control of soreshin disease of cotton incited by the fungus *Rhizoctonia solani*. This is demonstrated by the results from a test in a California cotton field. The field is seeded with cotton in the normal manner, except that the granules prepared as described in this example are added to alternate rows. These granules are dropped in such a way that some fall into the furrow and some are mixed with the covering soil. The rate of application is such as to employ 2.0 kilograms of active chemical of this invention per 3600 meters of row. The remaining rows are untreated.

Six weeks after planting, the cotton plants of both treated and untreated rows are examined for the presence of soreshin lesions. The plants in the treated rows are healthy and vigorously growing without any evidence of attack by the fungus. Plants in the untreated rows are severely damaged by soreshin and many lesions are present on the stalks of all plants, some of which have already died. Control of this disease by the compound of this examples through soil application demonstrates the systemic nature of these fungicides.

28

EXAMPLE 21

| | Percent |
|---|---|
| High-strength composition of Example 12 | 12 |
| Sodium sulfate | 10 |
| Attapulgite | 78 |

The above ingredients are blended, moistened with water, granulated, and dried. A 30–60 mesh (0.25 mm.–0.59 mm.) fraction is then obtained by sieving.

The compound formulated as granules in this example is useful for the systemic control of cucumber powdery mildew (*Erysiphe cichoracearum*). This is demonstrated in a greenhouse test in which the granules of this formulation are incorporated into potting soil into which Black Diamond cucumbers are planted. The soil in three pots is mixed with the granules of this formulation at a rate to provide 50 p.p.m. of the active ingredient in the total amount of soil in the pot. Three other pots are treated in a similar manner with an equal amount of the diluents but no active ingredient. All plants are inoculated with the powdery mildew fungus by dusting the fungal spores onto the leaves when the seedings are two weeks old. The plants are incubated in the greenhouse.

Observation of the plants after two weeks reveals that those treated with the granules of this formulation are healthy, normal and vigorously growing. The untreated plants are severly infected with powdery mildew as evidenced by the obvious presence of the fungus on chlorotic, poorly developed leaves, some of which have withered and died. These results indicate that the compounds of this invention are systemic as well as providing effective control of cucumber powdery mildrew.

Other high-strength compositions of this invention can be formulated and applied in like manner to give like results.

EXAMPLE 22

| | Percent |
|---|---|
| Wettable powder of Example 10 | 10 |
| Crude calcium, ligninsulfonate | 6 |
| Sodium sulfate, anhydrous | 10 |
| Kaolin | 37 |
| Calcium, magnesium bentonite | 37 |

The above ingredients are blended and moistened with about 15% water. This mixture is extruded as approximately 3 mm. diameter cylinders which are cut to produce 3 mm. x 3 mm. pellets. After drying, the pellets are applied as described in Example 20 with like results.

What is claimed is:

1. A compound of the formula:

$$\begin{array}{c} \text{benzothiadiazine structure with } -\text{NHC}(\text{O})\text{R}_1 \text{ and } \text{S} \rightarrow (\text{O})_n, \text{ substituents X and R}_2 \end{array}$$

wherein
X is hydrogen, halogen, alkyl of 1 to 4 carbon atoms, alkoxy of 1 to 4 carbon atoms, or trifluoromethyl;
$R_1$ is alkyl of 1 to 4 carbon atoms or allyl;
$n$ is 0 to 1;
$R_2$ is hydrogen, $$-\overset{Y}{\underset{}{C}}-NH-\overset{O}{\underset{}{C}}-Y'R_3, \quad -\overset{Y}{\underset{}{C}}-NH-\overset{O}{\underset{}{C}}-R_4$$

$$-\overset{Y}{\underset{}{C}}-NH-\overset{O}{\underset{\downarrow O}{S}}-R_5, \quad -\overset{O}{\underset{}{C}}-NH-R_6, \quad -SZ \text{ or } -\overset{Y}{\underset{}{C}}-R_7$$

Y and Y' are oxygen or sulfur;
$R_3$ is alkyl of 1 to 4 carbon atoms;
$R_4$ is alkyl of 1 to 17 carbon atoms; cycloalkyl of 3 to 6 carbon atoms; aryl of 4 to 10 carbon atoms; phenyl substituted with alkyl of 1 to 4 carbon atoms, halogen, nitro, alkoxy of 1 to 4 carbon atoms or cyano;

$R_5$ is alkyl of 1 to 18 carbon atoms; phenyl; phenyl substituted with alkyl of 1 to 4 carbon atoms, halogen, nitrogen, alkoxy of 1 to 4 carbon atoms or cyano;

$R_6$ is alkyl of 1 to 12 carbon atoms, aryl of 4 to 10 carbon atoms or phenyl substituted with alkyl of 1 to 4 carbon atoms, halogen, nitro, alkoxy of 1 to 4 carbon atoms or cyano;

$R_7$ is alkyl of 1 to 17 carbon atoms; alkoxy of 1 to 12 carbon atoms; alkenyloxy of 3 to 4 carbon atoms; phenoxy; benzyloxy; or cycloalkoxy of 5 to 6 carbon atoms;

Z is alkyl of 1 to 2 carbon atoms; alkyl of 1 to 2 carbon atoms substituted with chlorine or fluorine; phenyl; phenyl substituted with methyl, chlorine, nitro or methoxy; or benzyl.

2. A compound of claim 1 wherein X is hydrogen, $R_2$ is hydrogen or

$n$ is O, and $R_1$ is methyl.

3. 1H-2,1,4-benzothiadiazine-3-carbamic acid, methyl ester.

4. 1-hexanoyl-2,1,4-benzothiadiazine-3-carbamic acid, methyl ester.

5. A process for making the compounds of claim 1 wherein $R_2$ is hydrogen and $n$ is 0 comprising reacting an alkoxycarbonyl isothiocyanate of the formula

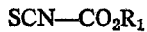

with an o-nitroaniline of the formula

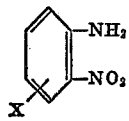

wherein $R_1$ and X are as defined in claim 1, in a suitable solvent to form a thioallophanate of the formula

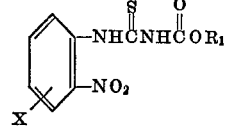

reducing said thioallophanate with the reducing agent sodium hydrosulfite in the presence of a base and a solvent selected from water, alkanol of 1 to 4 carbons, and mixtures thereof.

6. A process for making the compounds of claim 1 wherein $R_2$ is other than hydrogen and $n$ is 0 comprising the process of claim 5 with the additional step of reacting the reduction product with an isocyanate, isothiocyanate, alkanoyl halide or sulfonyl halide to provide the $R_2$ substituent.

7. A compound of claim 1 wherein X is hydrogen; $R_1$ is methyl or ethyl; $n$ is 0 or 1; $R_2$ is hydrogen,

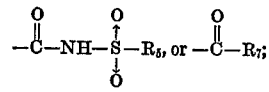

$R_5$ is phenyl or phenyl substituted with methyl, chlorine, or nitro; $R_7$ is alkyl or 1 to 17 carbon atoms, alkoxy of 1 to 4 carbon atoms, phenoxy, or benzyloxy.

8. The compound of claim 7 wherein $R_2$ is

References Cited

UNITED STATES PATENTS 3,303,190    2/1967    Loev _____ 260—243

JOHN M. FORD, Primary Examiner

U.S. Cl. X.R.

260—552; 424—246

PO-1050
(5/69)

UNITED STATES PATENT OFFICE
CERTIFICATE OF CORRECTION

Patent No. 3,655,657  Dated April 11, 1972

Inventor(s) John B. Adams, Jr.

It is certified that error appears in the above-identified patent and that said Letters Patent are hereby corrected as shown below:

In Column 28, line 66,

" $\overset{Y}{\underset{\|}{-C-R_7}}$ "  should appear as -- $\overset{O}{\underset{\|}{-C-R_7}}$ -- .

In Column 29, line 3,

"nitrogen" should read -- nitro -- .

Signed and sealed this 13th day of March 1973.

(SEAL)
Attest:

EDWARD M. FLETCHER, JR.  ROBERT GOTTSCHALK
Attesting Officer  Commissioner of Patents